United States Patent [19]

Hopwood

[11] Patent Number: 4,989,071
[45] Date of Patent: Jan. 29, 1991

[54] METHOD OF PREPARING A HOLOGRAM USING READILY AVAILABLE LIGHT SOURCES

[75] Inventor: Anthony I. Hopwood, Macclesfield, England

[73] Assignee: Ilford Limited, Cheshire, England

[21] Appl. No.: 327,995

[22] Filed: Mar. 23, 1989

[30] Foreign Application Priority Data

Mar. 24, 1988 [GB] United Kingdom ................ 8807030

[51] Int. Cl.$^5$ .......................................... H04N 15/00
[52] U.S. Cl. ......................................... 358/2; 358/90; 350/3.83
[58] Field of Search ..................... 358/2, 90; 350/3.6, 350/3.61, 3.66–3.69, 3.75, 3.76, 3.83; 430/1

[56] References Cited

U.S. PATENT DOCUMENTS

| | | |
|---|---|---|
| 3,566,021 | 2/1971 | Jakes, Jr. et al. |
| 3,600,056 | 8/1971 | King, Jr. |
| 3,625,584 | 12/1971 | St. John |
| 3,647,289 | 3/1972 | Weber |
| 3,695,744 | 10/1972 | Clay ..................................... 358/2 X |
| 3,826,555 | 7/1974 | Matsumoto |
| 3,860,950 | 1/1975 | Wick et al. .............................. 358/2 |
| 4,007,481 | 2/1977 | St. John ................................. 358/2 |
| 4,142,204 | 2/1979 | Hannan .................................. 358/2 |
| 4,235,505 | 11/1980 | Hariharan et al. |
| 4,375,649 | 3/1983 | Mir et al. |
| 4,378,142 | 3/1983 | Ono |
| 4,378,568 | 3/1983 | Mir |
| 4,442,455 | 4/1984 | Huignard et al. |
| 4,610,499 | 9/1986 | Chern et al. |
| 4,623,214 | 11/1986 | Bazargan |
| 4,623,215 | 11/1986 | Bazargan |
| 4,712,852 | 12/1987 | Funato et al. |
| 4,758,093 | 7/1988 | Stern et al. .................... 350/3.71 X |
| 4,895,419 | 1/1990 | Doyle et al. |

FOREIGN PATENT DOCUMENTS

| | | |
|---|---|---|
| 0036298 | 9/1981 | European Pat. Off. |
| 0087281 | 8/1983 | European Pat. Off. |
| 0106607 | 4/1984 | European Pat. Off. |
| 0245198 | 11/1987 | European Pat. Off. |
| 0128033 | 12/1989 | European Pat. Off. |
| 1924585 | 5/1969 | Fed. Rep. of Germany |
| 58-115469 | 7/1983 | Japan |
| 1278672 | 6/1972 | United Kingdom |
| 1316677 | 5/1973 | United Kingdom |
| 2159979 | 12/1985 | United Kingdom |

OTHER PUBLICATIONS

C. J. Kramer, "Holographic Laser Scanners for Nonimpact Printing", 2394 *Laser Focus*, vol. 17 (1981) Jun., No. 6.
H. P. Herzig et al, "Holographic Optical Scanning Elements: Analytical Method for Determining the Phase Function", 736A *J. Opt. Soc. Am. A/Optics & Image Science 4*, vol. 4, No. 6 (1987) Jun.
Von A. W. Pressdee, "Holografische Kopien sind falschungssicher", 2253 *Laser und Optoelektronik*, 18 (1986) Mar., No. 1.
Par Y. Belvaux, "Duplication des Hologrammes", *Annales De Radioelectricite*, T. XXII., No. 88, Apr. 22, 1967.
Defensive Publication Ser. No. 697,792, 04/15/69.
"Preparation of reflection holograms by interference copying of transmission holograms", V. A. Vanin, 2287

(List continued on next page.)

Primary Examiner—Victor R. Kostak
Attorney, Agent, or Firm—Burns, Doane, Swecker & Mathis

[57] ABSTRACT

A method of preparing a color separation holographic master which can be used in the preparation of a colored hologram of an object, by illuminating the object with light having a very narrow wavelength range and capturing the reflectance values on the object using a detector placed as if it were along the axis of the laser to be used for the holographic exposure and storing these reflectance values as a positive image, then carrying out a holographic exposure of the object using a laser there being present in the object beam between the laser and the object as a light modulating means the positive image of the captured reflectance values, and then processing the holographic material to fix the holographic fringes therein.

13 Claims, 4 Drawing Sheets

OTHER PUBLICATIONS

Soviet J of quantum electronics, vol. 8, No. 7 (1978.07) New York.
European Search Report, RS 81117 CH.
European Search Report, RS 81286 CH.
European Search Report, RS 81287 CH.
Patent Abstract of Japan, vol. 8, No. 31, Feb. 9, 1984.
Paten Abstract of Japan, vol. 10, No. 19, Jan. 24, 1986.
Patent Abstract of Japan, Vo. 7, No. 224, Oct. 5, 1983.
Patent Abstract of Japan, vol. 3, No. 38, Mar. 30, 1979 believed to relate to Japanese Patent 54 17865.

METHOD OF PREPARING A HOLOGRAM USING READILY AVAILABLE LIGHT SOURCES

BACKGROUND OF THE INVENTION

This invention relates a method of preparing a color hologram.

It has been known for a number of years that the best color reproduction from three monochromatic color sources requires the wavelengths of 450 nm, 570 nm and 610 nm (See Journal of the Optical Society of America Volume 61, Number 9, page 1155, W.A. Thornton). This is also true of three color holography. However lasers which emit at these wavelengths are not readily available. We have found a method of Preparing a three color hologram in which the colors are reproduced as if lasers emitting at the above wavelengths had been used but by using more readily available light sources.

Various background prior art is known to us, for example, that of Japanese patent No. JP-A-58 184 985 (as described in Patent Abstracts of Japan Volume 8 No. 31 (P-253) and that of Japanese patent No. JP-A-54 17 865 (as described in Patent Abstracts of Japan Volume 3, No 38 (E-101) and also European patent No. 128,033, British Patent No. 1316677 and U.S. Pat. No. 4235505. However none of this prior art relates to the problem which it is the object of this invention to solve.

SUMMARY OF THE INVENTION

Therefore according to the present invention as a first step there is provided a method of preparing a color separation holographic master which can be used in the preparation of a colored hologram of an object which comprises illuminating the object with light having a very narrow wavelength range and capturing the reflectance values on the object using a detector placed as if it were along the axis of the laser to be used for the holographic exposure and storing these reflectance values as a positive image, then carrying out a holographic exposure of the object using a laser there being present in the object beam between the laser and the object as a light modulating means the positive image of the captured reflectance values, and then processing the holographic material to fix the holographic fringes therein.

This produces a hologram which records light reflected from the hologram during the illumination. Thus if the illumination light used was a narrow range of blue light only the blue or blue reflecting areas of the object would be captured and stored as a positive image. The holographic exposure using this positive image to modulate the laser beam during exposure would produce a holographic image which would represent only those areas of the object which reflect blue light. Thus a blue color separation hologram would be prepared.

Preferably three such holograms are produced one of which is obtained using a narrow range of blue light, one of which is obtained using a narrow range of green light and one of which is obtained using a narrow range of red light, thus producing a blue record, a green record and a red record.

Preferably to prepare these color separation holographic records the object is illuminated by incident specular white-light using a narrow pass-band blue filter, a narrow pass-band green filter and a narrow pass-band red filter.

Most preferably the narrow pass-band blue filter passes light at 460 nm, the narrow pass-band green filter passes light at 540 nm and the narrow pass-band red filter passes light at 610 nm. As just stated these are the preferred wavelengths for the production of three color holograms.

It is comparatively easy to obtain such narrow pass-band color filters.

Often point highlights on a object are reproduced on a holographic record and when such a hologram is viewed such highlights emphasize areas or points in the holographic image of the object in such a way which distorts the representation or renders it difficult to view the image in its entirety. Thus it would be preferred if the object appeared to display even reflectivity over its entire surface.

This may be achieved by illuminating the object with incident light of substantially the same wavelength as the laser to be used for the laser exposure and capturing the reflectance values of the object using a detector which is placed as if it were along the axis to be used for the holographic exposure and storing these reflectance values as a negative image, then during the holographic exposure modulating the object beam by placing in the object beam this negative image between the laser and the object.

By use of this method in the hologram prepared the object may be made to appear to reflect uniformly over its whole surface.

Therefore according to one preferred method of the present invention there is provided a method for preparing color separation holographic masters of an object on holographic material by holographic laser exposure which comprises illuminating the object three times with white light and capturing the reflectance values of the object using a detector having during the first illumination a narrow pass band blue filter, during the second illumination a narrow pass band green filter and during the third exposure a narrow pass band red filter, in all the illuminations the detector being placed as if it were along the axis of the laser to be used for the holographic exposure and storing the reflectance information from each exposure as positive images, illuminating the object with incident light of substantially the same wavelength as the laser light to be used for the holographic exposure and capturing the reflectance values from the object using a detector which is placed as if it were along the axis of the laser to be used for the holographic exposures of the object on to holographic material and storing the reflectance information as a negative image, then carrying out three holographic exposures of the object on to holographic material there being present in the object beam between the laser and the object light modulation means which represents the sum of one of the three positive images and the negative reflectance image and processing the holographic material to fix the holographic fringes therein to produce three holographic separation records, one of which represents the blue record, one of which represents the green record and one of which represents the red record.

Preferably the white light used is specular white light. The detector used during these illuminations may be placed where the laser is to be placed during the holographic exposure or it may view the object using a mirror in such a way that it appears to be situated at the laser position.

It is to be understood that the three color separation reflectance illuminations may take place in any order and the high spot reflectance illumination may take place before or after any of the other illuminations or between any two of them.

Most preferably three holographic exposures are carried out using three different laser wavelengths and thus three high-spot reflectance illuminations are carried out. Conveniently the 488 nm and the 514 nm lines of the Argon ion laser are used together with the 633 nm line of the HeNe laser. Thus preferably to obtain the high-spot reflectance values of the object three reflectance illuminations are carried out using a narrow pass-band filter which passes light at 488 nm, a narrow pass-band filter which passes light at 514 nm and a narrow pass-band filter which passes light at 633 nm.

Therefore according to the most preferred method of the present invention there is provided a method for preparing color separation holographic masters of an object on holographic material by holographic laser exposure which comprises illuminating the object three times with white light and capturing the reflectance values of the object using a detector having during the first illumination a narrow pass band blue filter which passes light at 480 nm, during the second illumination a narrow pass band green filter which Passes light at 540 nm and during the third illumination a narrow pass band red filter which passes light at 610 nm in all the illuminations the detector being placed as if it were along the axis of the laser to be used for the holographic exposure and storing the reflectance information from each exposure as positive images, then illuminating the object three times with white light and capturing the reflectance values of the object using a detector having during the first illumination a narrow pass-band filter which passes light at 488 nm, during a second illumination a narrow pass-band filter which passes light at 514 nm and during a third illumination a narrow pass-band filter which passes light at 633 nm, in all the illuminations capturing the reflectance values from the object using a detector which is placed as if it were along the axis of the lasers to be used for the holographic exposures of the object and storing the reflectance information from each exposure as negative images, then carrying out three holographic exposures of the object on to holographic material using firstly the 488 nm line of an Agon ion laser there being present in the object beam between the laser and the object light modulation means which represents the sum of the positive image of illumination at 450 nm and the negative image of the illumination at 488 nm, using secondly the 514 nm line of an Argon ion laser there being present in the object beam between the laser and the object light modulation means which represents the sum of the positive image of the illumination at 540 nm and the negative of the illumination at 514 nm and using thirdly the 633 nm line of a He Ne laser there being present in the object beam between the laser and the object light modulation means which represents the sum of the positive image of the illumination at 610 nm and the negative image of the illumination at 633 nm, and processing the holographic material to fix the holographic fringes therein to produce three holographic separation records, one of which represents the blue record, one of which represents the green record and one of which represents the red record.

During the second set of illuminations to obtain the negative images it is preferred to use white light and narrow pass-band filters rather than the lasers themselves as speckle-free images are obtained thereby.

There are two main ways of capturing the reflectance values and storing them. One method involves the use of a photographic camera as the detector device and photographic film material as the storage device.

Therefore in one method of the present invention there is provided a method of preparing a hologram of an object on holographic material by a holographic laser exposure which comprises illuminating the object three times with white light and taking a photograph of the object when so illuminated the camera being placed as if it were on the axis of the laser to be used for the holographic exposure having as set forth above a blue, green or red filter, the photograph being taken on film which is processed to yield three positive transparencies of the object, illuminating the object with incident light of substantially the same wavelength as the laser light to be used for the holographic exposure and taking a photograph of the object when so illuminated using a camera which is placed as if it were on the axis of the laser to be used for the holographic exposure, the photograph being taken on film which is processed to yield a negative image of the object, carrying out three holographic exposures of the object on to holographic material there being present during each exposure in the object beam between the laser and the object a filter which comprises one of the three said positive transparencies each being used in turn, in register with the said negative image of the object, and processing the holographic material to fix the holographic fringes therein to yield three holograms one of which represents the blue record, one of which represents the green record and one of which represents the red record.

Preferably the blue record replays at substantially the same wavelength as the blue light used to capture the reflectance characteristics to blue light, and similarly for the green and red record.

Black and white or color film can be used in the camera to prepare the negatives or positives.

Thus the combination of the filters used for the exposure and the film's characteristic curve would be so chosen that the resultant positive transparencies would modulate the illumination of the object during the holographic exposure so as to yield in effect three color separated holograms one of which is the minus-blue record of the object, one of which is the minus-green record of the object and one of which is the minus-red record of the object.

Preferably both the positive transparencies and the negative transparency are exposed to provide unsharp images thus providing unsharp masks which facilitates the registration of the modulated laser beam with the object.

In the preferred way of capturing the reflectance values and storing them a video camera is used as the detector device and a pixel array of light valves as the storage device.

Therefore according to this method of the present invention there is provided a method of preparing a hologram of an object on holographic material by a holographic laser exposure which comprises illuminating the object three times with white light and preparing video signals representative of these images by use of a video camera placed as if it were on the axis of the laser to be used for the holographic exposure, the video camera being associated sequentially with a blue, a green and a red narrow pass-band filter, digitizing the video signals and storing them in a matrix passing this information to a pixel array of light valves as a positive image of the signals, illuminating the object with incident light of substantially the same wavelength as the laser to be used for the holographic exposure and preparing a video signal representative of that image by use of a video camera placed as if it were on the axis of the laser to be used for the holographic exposure, digitizing the video signals and storing them in a matrix, passing this information to a pixel array of light valves as a negative image of the signals, then carrying out three holographic exposures of the object on to holographic material, there being present in turn in the object beam between the laser and the object either one of the three arrays of light valves which carries a positive image of the reflectance values and the array of light valves which carries the said negative image or an array of light valves which carries an image which is a summation of both of one said positive images and the negative image, and processing the holographic material to fix the holographic fringes therein to yield three holograms one of which is the blue record of the object, one of which is the green record of the object and one of which is the red record of the object.

The final color hologram may be prepared from these records by copying the holographic information in the records into a recording medium or media which after processing will yield red, green and blue records replaying at near the mid-wavelength of each narrow passband filter used to assess the reflectance values of the object.

In a manner similar to the use of the photographic transparencies the information stored as the positive image in the array of light valves can be used to modulate the illumination of the object during the laser exposure to prepare the color separation records of the three colors used for the illumination and the information stored as the negative image in the array of light valves modulates the illumination of the object during the laser exposure so as to cause the object to appear to be uniformly reflective.

Preferably there is provided a monitor coupled to the signal digitizing means and means are provided for altering the stored image in the matrix and communicating this alteration to the matrix array of light valves.

Thus there appears on the monitor a view of the illuminated object after the illuminating light has been modulated by the array of light valves. Thus a closed-loop alteration in real time can be made until the satisfactory image appears on the monitor indicating that the desired corrections have been made to the image in the array of light valves to enable it to modulate the laser beam.

Preferably the means for altering the stored image includes a means for selectively controlling each element of the matrix array of the digitized image and includes means for transmitting the modified image to the matrix array of light valves. Thus the elements of the light valve array are turned on or off corresponding to the digitized image to produce a density mask having localized correction areas.

By an array of light valves is meant an array of pixels which are directly addressable and are activatable from a light block to a light transmitting condition by selective application of an electric field.

A particularly useful light valve array is a liquid crystal device (L.C.D.). Light valves can be made from other materials such as is described in U.S. Pat. No. 4,375,649 and as described in U S. Pat. No. 4,378,568. These materials are electro-optic material transformable by an electric field from a non-polar, isotropic state to a polar state.

Preferably the optical density of each pixel in the L.C.D. can be altered to give a range of optical densities.

The holographic material used may be a gelatino silver halide emulsion dichromated gelatin or a photopolymer sensitized system.

A suitable photopolymerization mixture comprises in the hydrophilic water-swellable binder an ethylenically unsaturated monomer, a dye capable of initiating free radical polymerization on exposure to light in the presence of an initiator and an initiator.

The suitable ethylenically unsaturated monomers for use in the present invention are the metal salts of acrylic or methacrylic acids. The preferred salts are lithium, sodium, potassium, barium, lead, zinc or magnesium acrylate. The most preferred salts are lithium or zinc acrylate.

Mixture of the metal acrylates may be used or mixture of metal acrylate and another ethylenically unsaturated monomer such as acrylamide, methacrylamide, N-hydroxymethylacrylamide, methylene bisacrylamide. Also esters of acrylic and methacrylic acids having low volatility may also be used, for example pentacrythritol tetraacylate, trimethylolpropane trimethacrylate and polybutanediol diacrylate.

Suitable dyes for initiating free radical polymerization include riboflavin, Rose Bengal, erythosin and eosin.

Suitable polymerization initiating compounds include methanolamine, and ketones and such as benzophenone, peroxides such as benzoyl peroxide, sulphur compounds such as diphenyl sulphite and azo compounds such as azoxystyrene.

The photosensitive layer may have been coated on the base by any of the conventional techniques well known to the photographic industry such as by use of a doctor bar, or by slot, cascade curtain or dip methods. The coated layer may then be dried by normal hot air methods. When the material is a dichromated gelatin hologram the coated gelatin layer is sensitized with a dichromate solution just before it is holographically exposed.

The holographic exposure method used to produce the hologram may be any of the well known methods used to produce either a transmission or preferably reflection hologram using a laser source. A particularly suitable exposure method is the Denisyuk method for producing a reflection hologram. Any suitable laser source can be used but of particular utility to produce display holograms are He:Ne lasers, pulsed ruby lasers and argon-ion lasers.

The three holograms produced by the method of the present invention may be used to prepare a full color hologram by several methods.

In the simplest method the three color separation records are copied on to three separate sheets of holographic film material the three holograms are exposed in a fixed spatial position relative to the color separation masters. For each of the red, green and blue color separation masters a replay beam is used which has a divergence/convergence and angle of incidence chosen to create three same-sized images in the final copies.

The exposed films are processed in such a manner that together with the natural shrinkage of emulsion the copies replay at the wavelengths corresponding to the middle of the pass band of the red, green and blue filters used at the reflectance assessment step.

After processing, the holograms are laminated together in register.

One of the advantages of this method is that the wavelength of replay for the finished holograms is not limited to the laser wavelengths available. In the preferred method 450, 540 and 610 nm wavelengths are used for the blue, green and red records respectively.

Another way of producing a full-color hologram is to make use of special holographic assemblies such as a panchromatic sensitized emulsion and three exposures through the three color separation holograms. Similarly three exposures on to a bi-pack material containing a red sensitized emulsion and a green sensitized emulsion or on to a tri-pack material comprising blue, green and red sensitive emulsion layers may be carried out.

Another method lies in alteration of the processing of the exposed holographic material for example by pre-swelling the emulsion to alter its replay wavelength before exposure or to alter it after exposure by swelling the emulsion or by shrinking it. The method of swelling before exposure is well known in the literature. In this implementation all three color separations can be recorded in a single monochromatic emulsion layer.

BRIEF DESCRIPTION OF THE DRAWINGS

Other objects and advantages of the present invention will become apparent from the following detailed description of preferred embodiments as described in conjunction with the accompanying drawings in which.

DETAILED DESCRIPTION OF PREFERRED EMBODIMENTS

Figure 1:
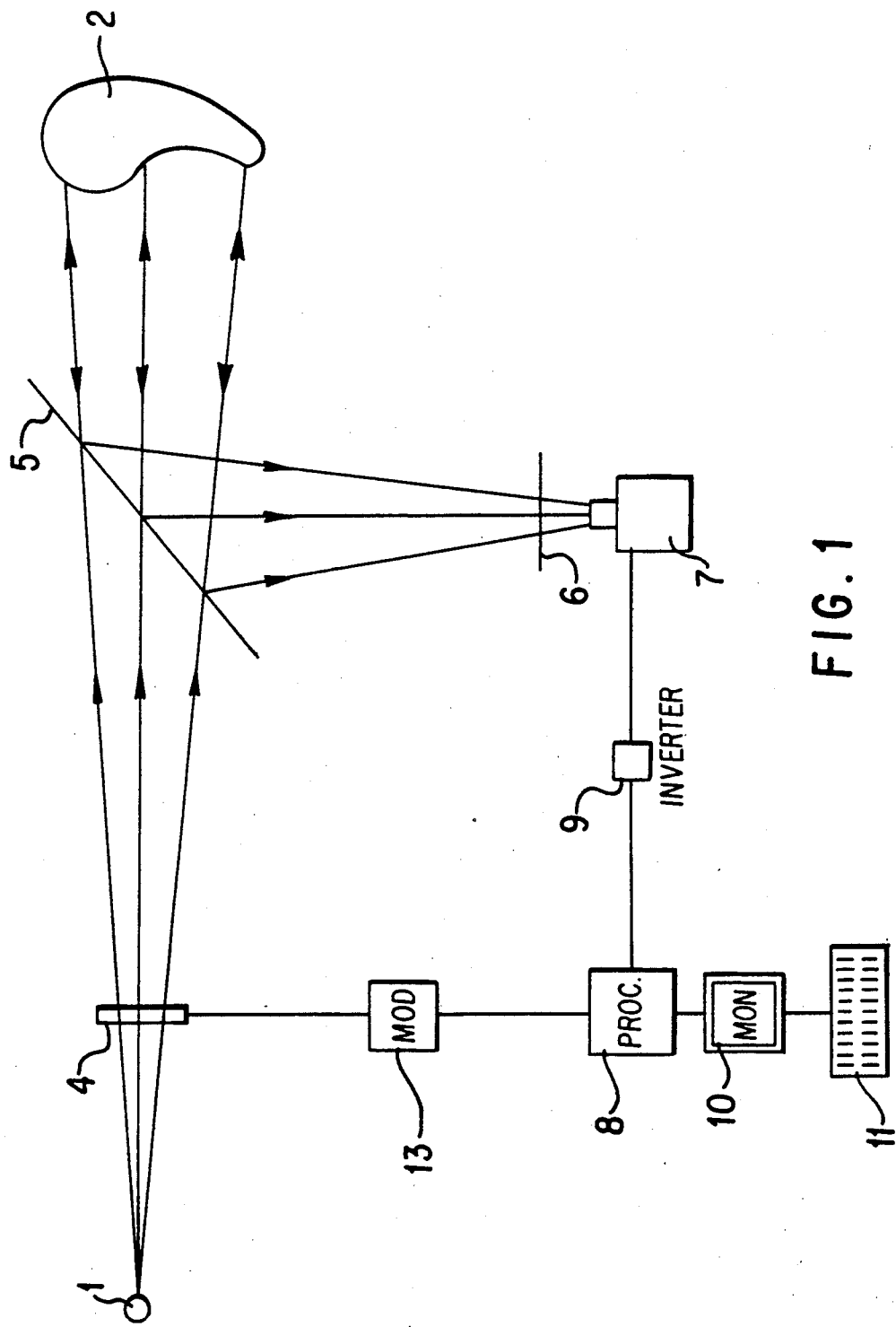
FIGS. 1 and 2 relate to the set-up employed when using a video camera and an L.C.D.

In FIG. 1 light from a white light source 1 specularly illuminates an object 2. The light from the source 1 passes through an L.C.D. 4 which initially is completely light transparent and passes through a beam splitter 5. Light from the object 2 is reflected back to the beam splitter 5 and some of it is passed to the video camera 7 via a filter 6.

Connected to the video camera 7 is a processor 8 which is programmed to digitize the image captured by the video camera and store it in a matrix array. Connected between the processor 8 and the camera 7 is an image inverter 9. Connected with the processor 8 is a video monitor 10. Connected to monitor 10 is a manual keyboard 11.

Also connected to the processor 8 is an R.F. modulator 13 which is connected to the L.C.D. screen 4.

In the first illumination a white light source 1 is activated and the white light reflected from the object 2 is picked up by the video camera 7 through filter 6 which is a narrow pass band blue filter. The video signals from the video camera 7 are passed to the processor 8 which digitizes them and stores them in a memory in a matrix array.

This image can be viewed on the monitor 10. If needs be this image can be altered on a pixel-by-pixel basis by inputting through the keyboard 11. The altered image can then be viewed on the monitor 10. The image from the processor is then relayed to the L.C.D. 4 through the R.F. modulator 13 to obtain the correct video format. The image from the processor 8 controls the L.C.D. 4 to turn individual pixels on or off or to a desired transmission level to allow transmission or blockage of light in accordance with the image viewed by the monitor.

This system is a system having a feed-back display of the modulation which will be achieved by use of the L.C.D. as a light filter in correcting the tonal values of the light reflected by the object as would be observed when blue light is used to illuminate the object.

This image array in the pixels of the L.C.D. is then stored in the processor 8 and the L.C.D. cleared. During this illumination the image inverter 9 is not employed.

A second illumination to white light is made as before but in this case using a narrow pass-band green filter in front of the video camera 7. As before the image captured by the video camera is digitized and stored in the matrix in a memory array and passed to the L.C.D. 4 and this image can be viewed on the monitor. This image array in the pixels of the L.C.D. is stored in the processor 8 and the L.C.D. cleared. During this illumination the image inverter is not employed.

A third illumination to white light is made as before but in this case using a narrow pass band red filter in front of the video camera 7. As before the image captured by the video camera is digitized and stored in the memory as a matrix array and then passed to the L.C.D. 4 and this image can be viewed on the monitor. This image array in the pixels of the L.C.D. is stored in the processor 8 and the L.C.D. cleared. During this illumination the image inverter is not employed.

In a fourth illumination the white light source 1 is activated and the white light reflected by the object 2 is picked up by the video camera 7 via an interference filter 6 at the laser wavelength which allows light to pass only over the range 628 to 638 nm as a He:Ne laser is to be used for the laser exposure.

In this case the video signals from the camera 7 are passed to the processor 8 via the image inverter 9 and stored in a memory in a matrix array, as what is in effect, a negative image. The image in the processor is then caused to control the L.C.D. 4 to allow as before transmission or blockage of light. This image can then be viewed on the monitor 10 to see if there is now equal light reflectance from all parts of the object.

If there is not the image can be altered by use of the key-board 11 which alters the light transmission of the pixels in the L.C.D. This image array of the pixels in the L.C.D. is stored in the memory and this information is then transferred in turn to the three sets of images stored in the processor 8 where it is combined to produce three images the first of which is the combined image information of the first and fourth combined (blue image signal), the second of which is the combined image information of the second and fourth illumination (green image signal) and the third of which is the integrated image information of the third and the fourth illumination (red image signal).

Figure 2:
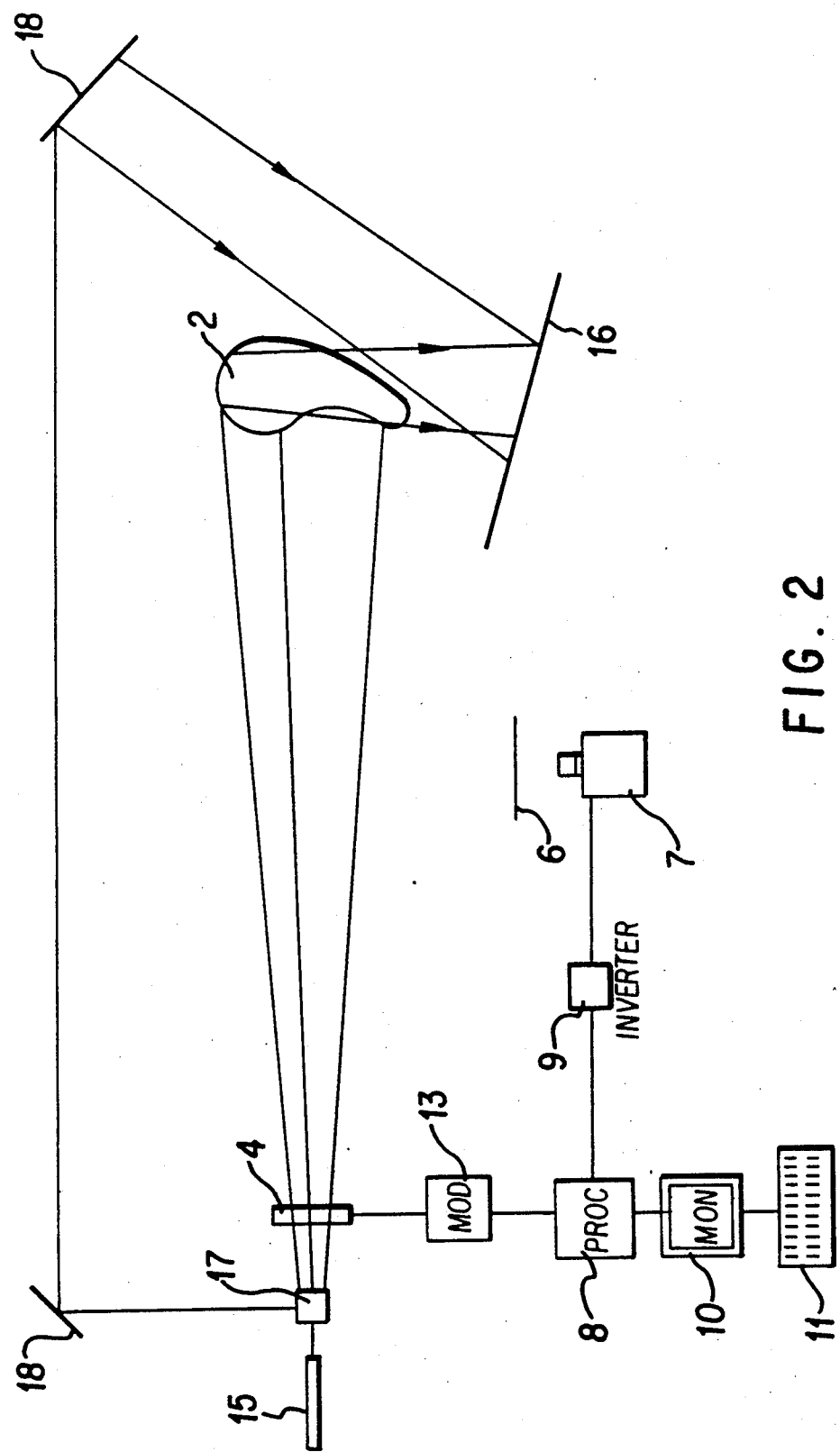

In FIG. 2 the same numbers have the same significance. The elements 7, 9, 10 and 11 are shown in the same position as the FIG. 1 but they are not used in this part of the method.

In FIG. 2 a He:Ne laser light source 15 has replaced the white light source 2 and a beam splitter 17 is used to focus part of the laser beam as a reference beam via mirrors 18 in to the sheet of holographic film material 16.

Before the laser light is activated the combined stored image in the processor 8 relating to the blue image is passed to the L.C.D. 4 to form a pattern of light and dark pixels therein.

In the set-up in FIG. 2 the holographic material 16 is exposed to produce a transmission hologram. The object beam from the laser 15 strikes the object 2 and some of this light is reflected back to the holographic material 16 as the object beam where it interferes with light from the reference beam to form the holographic fringes in the holographic material.

The hologram produced is a blue color separation holographic record of the object.

Two more similar laser exposures are carried out during the second exposure using the stored image relating to the green image and in the third exposure the stored image relating to the red image.

Thus three holograms are prepared one of which is the blue color separation record of the object, the second of which is the green color separation record of the object and the third of which is the red color separation record of the object.

Figure 3:
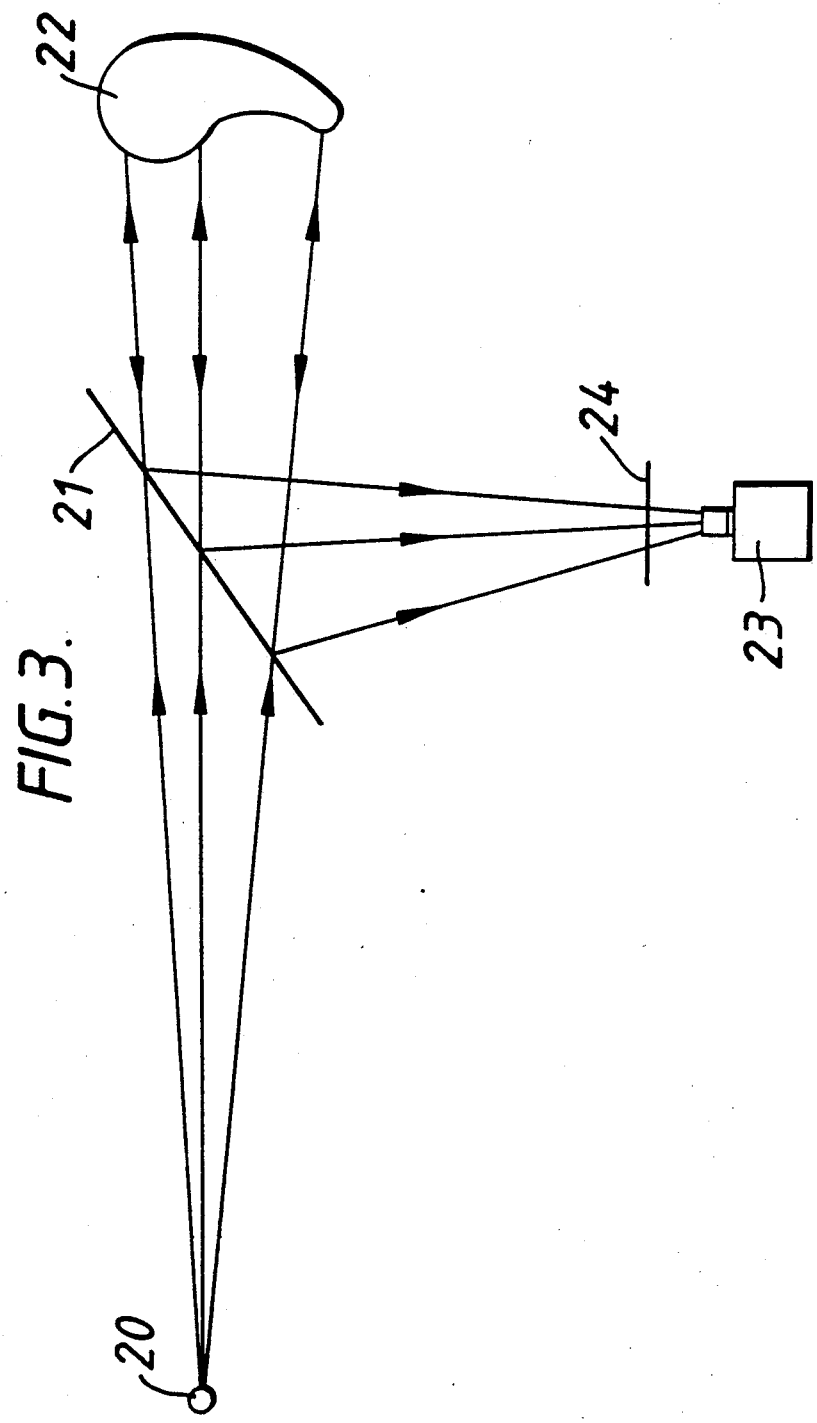
FIGS. 3 and 4 relate to the set-up employed when using a photographic camera and photographic transparencies as the laser light modulator.
Figure 4:
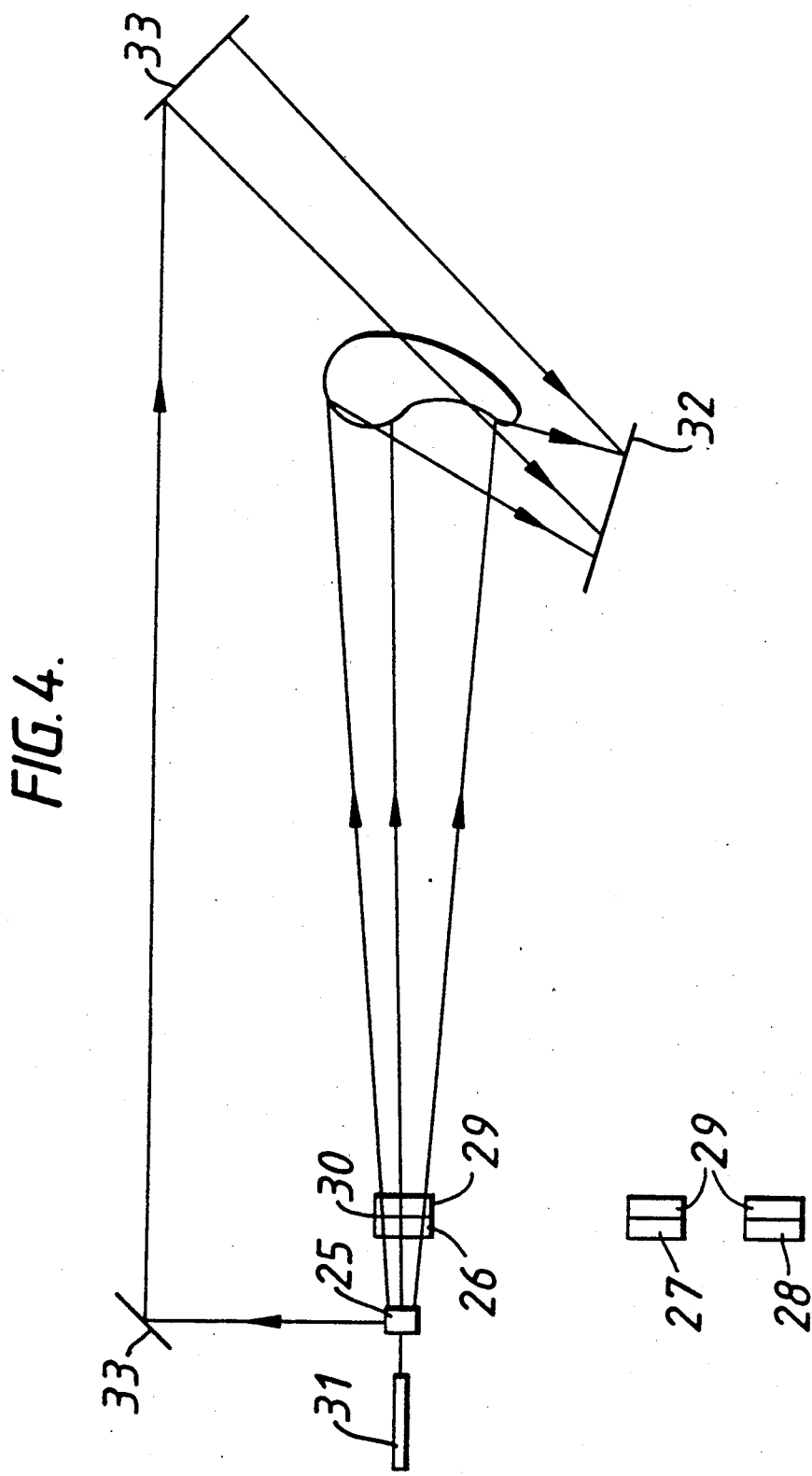

FIGS. 3 and 4 illustrate the method wherein photographic transparencies are used to modulate the object beam from the laser.

In FIG. 3 in a first camera exposure light from a white light source 20 passes via a beam splitter 21 to an object 22. Some of the light from the object is reflected via the beam splitter 21 to a photographic camera 23 via a blue filter 24. In the camera this light exposes a black and white film.

This film is removed from the camera and is processed to yield an unsharp black and white positive transparency 26 which is the blue record of the object.

In a second exposure the blue filter is replaced by a green filter. A similar exposure is carried out and in this case the black and white film is processed to yield an unsharp black and white positive transparency 27 which is the green record of the object.

In a third exposure the green filter is replaced by a red filter. A similar exposure is carried out and the black and white film is processed to yield an unsharp black and white positive transparency 28 which is the red record of the object.

In a fourth exposure the red filter is replaced by a narrow pass band filter which allows only light of 628-638 nm to pass. A similar exposure is carried out but in this case the black and white film is processed to form an unsharp black and white negative 29.

In FIG. 4 a He:Ne laser 31 has replaced the white light source 20. The object is in exactly the same place as in FIG. 3. A beam splitter 25 is used to split some of the laser light as a reference beam which is directed by mirrors 33 into the holographic material 32.

The laser 31 is then activated and the object beam passes through filter 30 which has been formed by laminating together positive 26 and negative 29 where it is modulated and passes to the object 22n and some of the modulated light is reflected back into the holographic material 32 where it intereferes with the light from the reference beam to form the holographic fringes. The holographic material is then processed to fix the holographic fringes to form a hologram which is the blue color separation record of the object.

Two further holographic exposures are carried out the second exposure the filter 30 was formed by laminating the positive transparency 27 with the negative 29 to form after processing a hologram which is the green separation record of the object.

In the third exposure the filter 30 was formed by laminating the positive transparency 28 with the negative 29 to form after processing a hologram which is the red separation record of the object.

The method of FIGS. 1 and 2 allows light modulating filters to be made in real-time but the equipment required is expensive.

The method of FIGS. 3 and 4 uses only a camera and filters in addition to the usual equipment used for holographic exposures. However four photographic processes are required to yield the transparencies and three filters are required. Furthermore several camera exposures may be required to obtain either suitable positive transparencies or a suitable negative.

It will be appreciated by those of ordinary skill in the art that the present invention can be embodied in other specific forms without departing from the spirit of essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method of preparing a color-separated holographic master for use in the preparation of a colored hologram of an object, comprising the steps of:
    illuminating the object with red light, green light, and blue light obtained from incident specular whitelight using alternately a blue filter, a green filter and a red filter respectively;
    capturing, as each illumination is performed, reflectance values of the object using a detector placed as if it were along the axis of a laser to be used for holographic exposure and storing these reflectance values to produce a blue record, a green record and a red record as a positive image;
    carrying out a holographic exposure of the object onto holographic material using the laser, with the positive image of the captured reflectance values being present in the object beam between the laser and the object as a light modulating means; and,
    processing the holographic material to fix holographic fringes therein.

2. A method according to claim 1 which further comprises illuminating the object three separate times with white light and capturing the reflectance values of the object using respectively a detector having, during the first illumination, a blue filter, during the second illumination a green filter, and during the third illumination a red filter, in all the illuminations the detector being placed as if it were along the axis of the laser to be used for the holographic exposure, and storing the reflectance information from each exposure as positive images, illuminating the object with incident light of substantially the same wavelength as the laser light to be used for the holographic exposure and capturing the reflectance values from the object using a detector which is placed as if it were along the axis of the laser to be used for the holographic exposures of the object on to holographic material and storing the reflectance information as a negative image, then carrying out three holographic exposures of the object on to holographic material there being present in the object beam between the laser and the object, light modulation means which represents the sum of one of the three positive images and the negative reflectance image, and processing the holographic material to fix the holographic fringes therein to produce three holographic separation records, one of which represents the blue record, one of which represents the green record and one of which represents the red record.

3. A method according to claim 1 which comprises illuminating the object three times with white light and capturing the reflectance values of the object using a detector having during the first illumination a blue filter which passes light at 450 nm, during the second illumination a green filter which passes light at 450 nm and during the third illumination a red filter which passes light at 610 nm in all the illuminations the detector being placed as if it were along the axis of lasers to be used for the holographic exposure and storing the reflectance information from each exposure as positive images, then illuminating the object three times with white light and capturing the reflectance values of the object using a detector having during the first illumination a filter which passes light at 488 nm, during a second illumination a filter which passes light at 514 nm and during a third illumination a filter which passes light at 633 nm, in all the illuminations capturing the reflectance values from the object using a detector which is placed as if it were along the axis of lasers to be used for the holographic exposures of the object and storing the reflectance information from each exposure as negative images, then carrying out three holographic exposures of the object on to holographic material using firstly the 488 nm line of an Argon ion laser there being present in the object beam between the laser and the object, light modulation means which represents the sum of the positive image of the illumination at 450 nm and the negative image of the illumination at 488 nm, using secondly the 514 nm line of an Argon ion laser there being present in the object beam between the laser and the object, light modulation means which represents the sum of the positive image of the illumination at 450 nm and the negative image of the illumination at 514 nm and using thirdly the 633 nm line of a He Ne laser there being present in the object beam between the laser and the object, light modulation means which represents the sum of the positive image of the illumination at 610 nm and the negative image of the illumination at 633 nm, and processing the holographic material to fix the holographic fringes therein to produce three holographic separation records, one of which represents the blue record, one of which represents the green record and one of which represents the red record.

4. A method according to claim 1 wherein the blue filter passes light at 450 nm, the green filter passes light at 540 nm and the red filter passes light at 610 nm.

5. A method according to claim 4 which comprises illuminating the object three times with white light and taking a photograph of the object when so illuminated, the camera being placed as if it were on the axis of the laser to be used for the holographic exposure having as set forth above a blue, green or red filter, the photograph being taken on film which is processed to yield three positive transparencies of the object, illuminating the object with incident light of substantially the same wavelength as the laser light to be used for the holographic exposure and taking a photograph of the object when so illuminated using a camera which is placed as if it were on the axis of the laser to be used for the holographic exposure, the photograph being taken on film which is processed to yield a negative image of the object, then carrying out three holographic exposures of the object on to holographic material there being present during each exposure in the object beam between the laser and the object, a filter which comprises one of the three said positive transparencies each being used in turn, in register with the said negative image of the object, and processing the holographic material to fix the holographic fringes therein to yield three holographs one of which represents the blue record, one of which represents the green record and one of which represents the red record.

6. A method according to claim 5 wherein black and white film is used in the camera.

7. A method according to claim 5 wherein color film is used in the camera.

8. A method according to claim 5 wherein both the positive transparencies and the negative transparency are exposed to provide unsharp images thus providing unsharp masks which facilitate the registration of the modulated laser beam with the object.

9. A method according to claim 1 which comprises illuminating the object three separate times with white light and preparing video signals representative of these images by use of a video camera placed as if it were on the axis of the laser to be used for the holographic exposure, the video camera being associated during the three illuminations with a blue, a green and a red filter respectively, digitizing the video signals and storing them in a matrix passing this information to a pixel array of light valves as a positive image of the signals, illuminating the object with incident light of substantially the same wavelength as the laser to be used for the holographic exposure and preparing a video signal representative of that image by use of a video camera placed as if it were on the axis of the laser to be used for the holographic exposure, digitizing the video signals and storing them in a matrix, passing this information to a pixel array of light valves as a negative image of the signals, then carrying out three holographic exposures of the object on to holographic material, there being present in turn in the object beam between the laser and the object either one of the three arrays of light valves which carries a Positive image of the reflectance values and the array of light valves which carries the said negative image or an array of light valves which carries an image which is a summation of both of one said positive image and the negative image, and processing the holographic material to fix the holographic fringes therein to yield three holograms one of which is the blue record of the object, one of which is the green record of the object and one of which is the red record of the object.

10. A method according to claim 9 wherein there is provided a monitor coupled to the signal digitizing means and means are provided for altering the stored image in the matrix and communicating this alteration to the matrix array of light valves.

11. A method according to claim 9 wherein the means for altering the stored image includes a means for selectively controlling each element of the matrix array of the digitized image and includes means for transmitting the modified image to the matrix array of light valves.

12. A method according to claim 9 wherein the light valve is a liquid crystal display.

13. A method according to claim 12 wherein the optical density of each pixel in the liquid crystal display can be altered to give a range of optical densities.

* * * * *